(12) United States Patent
Yan et al.

(10) Patent No.: US 7,955,758 B2
(45) Date of Patent: Jun. 7, 2011

(54) MEMBRANE ELECTRODE ASSEMBLY PREPARED BY DIRECT SPRAY OF CATALYST TO MEMBRANE

(75) Inventors: Susan G. Yan, Fairport, NY (US); John C. Doyle, Bergen, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1445 days.

(21) Appl. No.: 10/763,633

(22) Filed: Jan. 22, 2004

(65) Prior Publication Data
US 2005/0163920 A1 Jul. 28, 2005

(51) Int. Cl.
*H01M 8/10* (2006.01)
(52) U.S. Cl. ......................... 429/535; 429/492
(58) Field of Classification Search .................. None
See application file for complete search history.

(56) References Cited

U.S. PATENT DOCUMENTS

| | | | |
|---|---|---|---|
| 5,234,777 A | 8/1993 | Wilson | |
| 5,316,871 A | 5/1994 | Swathirajan et al. | |
| 5,330,860 A * | 7/1994 | Grot et al. | 429/42 |
| 6,074,692 A * | 6/2000 | Hulett | 427/115 |
| 6,277,513 B1 * | 8/2001 | Swathirajan et al. | 429/44 |
| 6,524,736 B1 | 2/2003 | Sompalli et al. | |
| 7,232,624 B2 | 6/2007 | Kim | |
| 7,316,794 B2 * | 1/2008 | O'Brien | 264/104 |
| 2002/0034675 A1 * | 3/2002 | Starz et al. | 429/42 |

FOREIGN PATENT DOCUMENTS
WO WO 03/095509 A1 11/2003

OTHER PUBLICATIONS

Wilson, M.S., Gottesfeld, S., "Thin-Film Catalyst Layers for Polymer Electrolyte Fuel Cell Electrodes", Journal of Applied Electrochemistry 22 (1992) 1-7.

* cited by examiner

*Primary Examiner* — K Walker
(74) *Attorney, Agent, or Firm* — John A. Miller; Miller IP Group, PLC

(57) ABSTRACT

A technique for fabricating an MEA. The technique includes providing a polymer electrolyte proton conducting membrane, and then spraying a catalyst ink directly on the membrane to form a catalyst layer. In one embodiment, the catalyst ink includes the proper ionomer to carbon ratio, such as 0.8/1, for the desired fuel cell performance. In another embodiment, the catalyst ink includes too little ionomer for the proper ionomer to carbon ratio for the desired fuel cell performance. An ionomer layer is sprayed on the membrane before the catalyst layer to provide the proper final ionomer to carbon ratio.

10 Claims, 2 Drawing Sheets

MEMBRANE ELECTRODE ASSEMBLY PREPARED BY DIRECT SPRAY OF CATALYST TO MEMBRANE

BACKGROUND OF THE INVENTION

1. Field of the Invention

This invention relates generally to a membrane electrode assembly (MEA) for a proton exchange fuel cell (PEMFC) and, more particularly, to an MEA for a PEMFC, where an anode catalyst layer and/or a cathode catalyst layer of the MEA is sprayed on a proton conducting membrane.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and the cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

It is known in the MEA art to coat the catalyst layer on the polymer electrolyte membrane. The catalyst layer may be deposited directly on the membrane, or indirectly applied to the membrane by first coating the catalyst on a decal substrate. Typically the catalyst is coated on the decal substrate as a slurry by a rolling process. The catalyst is then transferred to the membrane by a hot-pressing step. This type of MEA fabrication process is sometimes referred to as a catalyst coated membrane (CCM).

After the catalyst is coated on the decal substrate, an ionomer layer is sometimes sprayed over the catalyst layer before it is transferred to the membrane. Because both the catalyst and the membrane include the ionomer, the ionomer spray layer provides a better contact between the catalyst and the membrane, because it decreases the contact resistance between the catalyst and the membrane. This increases the proton exchange between the membrane and the catalyst, and thus, increases fuel cell performance. U.S. Pat. No. 6,524,736 issued to Sompalli et al., and assigned to the assignee of this invention, discloses a technique for making an MEA in this manner.

The decal substrate can be a porous expanded polytetrafluoroethylene (ePTFE) decal substrate. However, the ePTFE substrate is expensive and not reusable. Particularly, when the catalyst is transferred to the membrane on the ePTFE substrate, a certain portion of the catalyst or catalyst components remain on the ePTFE substrate. Additionally, the ePTFE substrate stretches, deforms and absorbs solvents making a cleaning step very difficult. Hence, every ePTFE substrate used to make each anode and cathode is discarded.

The decal substrate can also be a non-porous ethylene tetrafluoroethylene (ETFE) decal substrate. The ETFE decal substrate provides minimal loss of catalyst and ionomer to the substrate because virtually all of the coating is decal transferred. The substrate does not deform and can be reused. For both of these processes, the anode and cathode decal substrates are cut to the dimensions of the final electrode size, then hot-pressed to the perfluorinated membrane, and subsequently, the decal substrate is pealed off.

MEAs prepared by the above described decal substrate transfer processes have exhibited failure along the catalyst edge. Particularly, the membrane has been shown to tear adjacent to the outer edge of the catalyst layers on both the anode and cathode side of the MEA. This failure typically corresponds to the edge of the decal substrate during the hot-pressing step. Because the decal substrates are smaller in area than the membranes and have a thickness of about 3 mm, the decal substrate or active area section of the membrane would experience higher pressures than the remaining bare membrane areas during the hot-pressing step. This translates to a possible weakening of the membrane along the catalyst edges.

In another known fabrication technique, the MEA is prepared as a catalyst-coated diffusion media (CCDM) instead of a CCM. The diffusion media is a porous layer that is necessary for gas and water transport through the MEA. The diffusion media is typically a carbon paper substrate that is coated with a microporous layer, where the microporous layer is a mixture of carbon and Teflon. A catalyst ink is typically patched coated by a screen printing process on top of the microporous layer, and then compressed. A piece of bare perfluorinated membrane is sandwiched between two pieces of the CCDM with the catalyst sides facing the membrane, and then hot-pressed to bond the CCDM to the membrane.

However, this MEA fabrication process also suffers from membrane failure proximate the edge of the catalyst layer. Additionally, because the catalyst layer is smaller in area than the diffusion media and the membrane, there are areas where the diffusion media directly contacts the membrane outside of the catalyst layer. Therefore, gases being transported through the diffusion media react directly with the membrane instead of the catalyst, possibly causing combustion as a result of the interaction of hydrogen and oxygen, which also may damage the membrane.

Also, in the CCDM process, the ionomer in the catalyst tends to be adsorbed into the diffusion media because of its porosity resulting in less ionomer that is available to electrically couple the catalyst layer to the membrane when the CCDM is hot pressed to the membrane. Therefore, there is a reduction in MEA performance.

In addition, the processes discussed above involve wasting catalyst and ionomer, wasting material that isn't in the final MEA, and several processing steps that take up time and resources, such as die cutting, hot pressing and peeling off of decal substrates.

Another known MEA fabrication employs direct coating or painting a catalyst ink onto a perfluorinated membrane. The membrane is typically in the sodium ($Na^+$) or potassium ($K^+$) form, and not on the protonated form, so that when the catalyst ink is applied, the membrane does not swell. After the catalyst ink is applied, the membrane is hot-pressed to strengthen the catalyst layer. The final step involves protonating the membrane through acid exchange by immersing the membrane in boiling sulfuric acid for several hours followed by rinsing the membrane in deionized water to replace the sodium or potassium ions with protons ($H^+$).

In order to achieve low cost, efficient and durable fuel cells, the fabrication process of the known MEAs needs to be improved. The present invention provides a technique for fabricating MEAs that is simplified, and results in a more durable MEA than those MEAs known in the art.

SUMMARY OF THE INVENTION

In accordance with the teachings of the present invention, a technique for fabricating an MEA is disclosed. The technique includes providing a proton conducting membrane, and then spraying a catalyst ink directly on the membrane to form a catalyst layer. The catalyst ink can be sprayed on the membrane over several passes, where the ink is dried on the membrane during the spraying process by a heat lamp. In one embodiment, the catalyst ink includes the proper ionomer to carbon ratio, such as (0.8-1.2)/1, for the desired fuel cell performance. In another embodiment, the catalyst ink includes too little ionomer for the proper ionomer to carbon ratio for the desired fuel cell performance. An ionomer layer is sprayed on the membrane before the catalyst layer is sprayed on the membrane to provide the proper final ionomer to carbon ratio.

Additional processing steps can subsequently be performed to improve MEA performance. For example, the MEA can be soaked in a water bath or boiled in water, the MEA can be soaked in sulfuric acid bath to remove excess solvent and ensure protonation, and the MEA can be hot-pressed to remove excess solvent and to compress and possibly strengthen the catalyst layer.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a process for spraying a catalyst on a proton conducting membrane of an MEA is merely exemplary in nature, and is in no way intended to limit the invention or its applications or uses.

Figure 1:
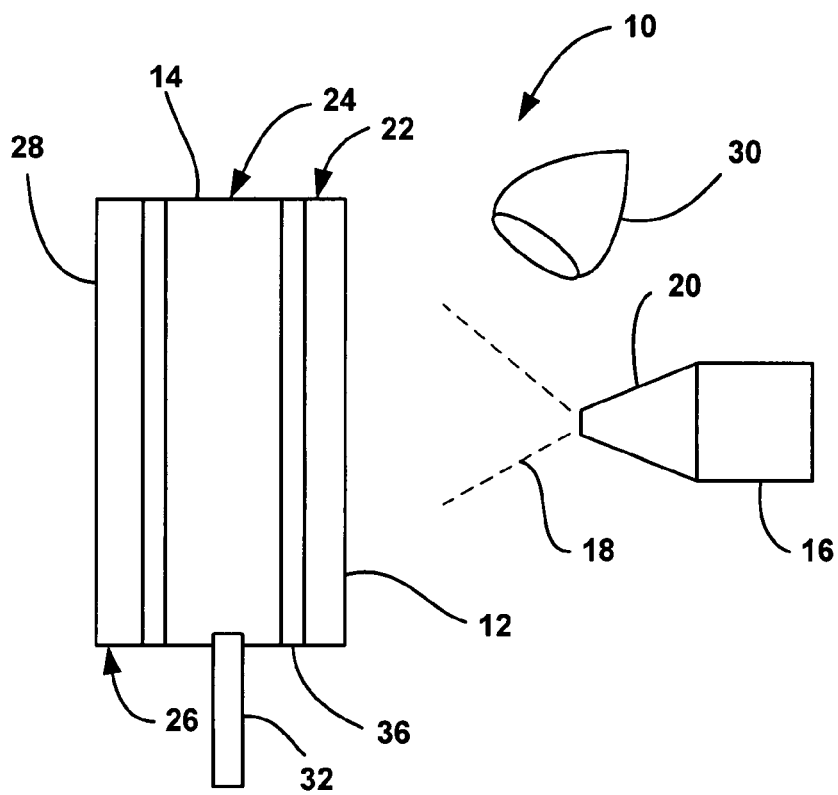
FIG. 1 is a plan view of a system for fabricating an MEA including a proton conducting membrane, where the system includes spraying a catalyst ink on the membrane to form a catalyst layer, according to an embodiment of the present invention.

The present invention is a simplified method of fabricating an MEA for a PEMFC that reduces costs, materials and manufacturing resources, and also increases MEA durability. FIG. 1 is a plan view of a system 10 for fabricating an MEA 24, according to the invention. The MEA 24 includes a polymer electrolyte proton conducting membrane 14 in its protonated form ($H^+$), such as a perflourinated membrane. The system 10 includes a sprayer 16 that emits a spray of catalyst ink 18 through a suitable nozzle 20 onto the membrane 14 to form a catalyst layer 12. In one embodiment, the sprayer 16 is an airbrush gun to deposit the catalyst layer 12 on the membrane 14 to the desirable thickness. In one embodiment, the catalyst ink 18 is a mixture of a catalyst, ionomer, alcohol and water such that the ionomer/carbon ratio is approximately (0.8-1.2)/1. However, this is by way of a non-limiting example. This operation forms an anode 22 of the MEA 24.

The system 10 can include a clamp 32 to clamp the membrane 14 down so that when the wet catalyst ink 18 is sprayed on the membrane 14 it does not wrinkle. The system 10 also includes a heat lamp 30, such as an infrared (IR) heat lamp, to dry the MEA 24 as the wet catalyst ink 18 is sprayed thereon.

After, the catalyst layer 12 is dried under the heat lamp 30, the membrane 14 is flipped over. The catalyst ink 18 is then sprayed by the sprayer 16 to deposit a catalyst layer 28 on the other side of the membrane 14, in the manner discussed above, to form a cathode 26 of the MEA 24. The catalyst layer 28 is also dried by the heat lamp 30. The cathode 26 of the MEA 24 has already been formed by the catalyst ink spraying operation shown in FIG. 1.

According to one embodiment, the catalyst ink 18 is sprayed onto the membrane 14 over several spraying passes under the lamp 30 until the catalyst layer 12 is the desired thickness. During this process, the catalyst ink 18 drops onto the membrane 14, and some of the solvent is evaporated off. This minimizes the degree of swelling that would occur if the catalyst ink 18 were to be painted or rolled on the membrane 14 as one thick layer.

A further modification could involve varying the ionomer distribution across the catalyst layer 12 to improve the performance of the MEA 24. According to another embodiment of the present invention, a thin ionomer layer 36 of an ionomer solution is sprayed on the membrane 14 by the sprayer 16 before the catalyst layer 12 is deposited. The catalyst ink 18 is then sprayed on the membrane 14 to deposit the catalyst layer 12. Thus, the ionomer spray goes directly into the membrane 14, and is not absorbed by a decal substrate or a diffusion media layer as in other processes known in the art. In this embodiment, the ink 18 includes a catalyst, solvent and half the ionomer concentration (ionomer/carbon ratio=0.4/1). The final catalyst layer 12 including the ionomer layer 36 yields a total ionomer/carbon ratio of approximately (0.8-1.2)/1.

Figure 2:
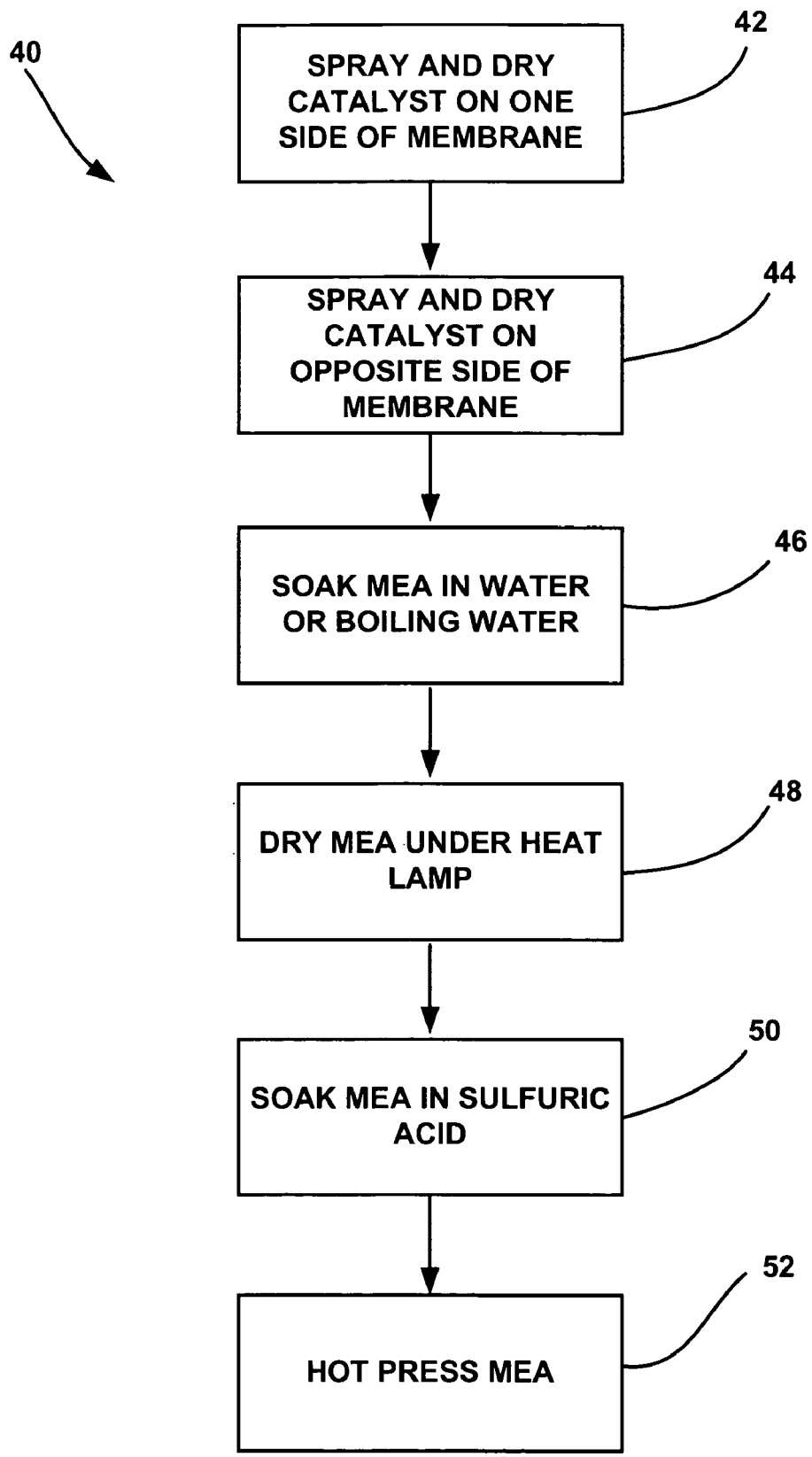
FIG. 2 is a flow diagram showing a process for making an MEA including a catalyst layer sprayed on a proton conducting membrane, according to an embodiment of the present invention.

The MEA 24 can now be used as is or further processing can be performed to improve the performance of the MEA 24. FIG. 2 is a flow diagram 40 that includes other steps in the process of making the MEA 24 that can be performed to provide this improved performance. Box 42 represents the process of spraying the catalyst ink 18 onto the membrane 14 to deposit the catalyst layer 12 and drying the catalyst layer 12 by the heat lamp 30 to form the anode 22, as discussed above. Box 44 represents flipping the membrane 14 over, and depositing the catalyst layer 28 on the membrane 14 and drying the catalyst layer 28 to form the cathode 26, as discussed above.

Additionally, the MEA 24 could then be soaked in a water bath or boiled in water, as represented by box 46. The MEA 24 is then dried by the lamp 30 to remove any excess solvent as represented by box 48. Also, the MEA 24 can be soaked in sulfuric acid bath to remove excess solvent and ensure protonation, as represented by box 50. This should not be necessary since the membrane 14 and the ionomer in the MEA 24 are already in the proton form. Further, the MEA 24 can be hot-pressed to remove excess solvent and to compress and possibly strengthen the catalyst layer 12, as represented by box 52.

Figure 3:
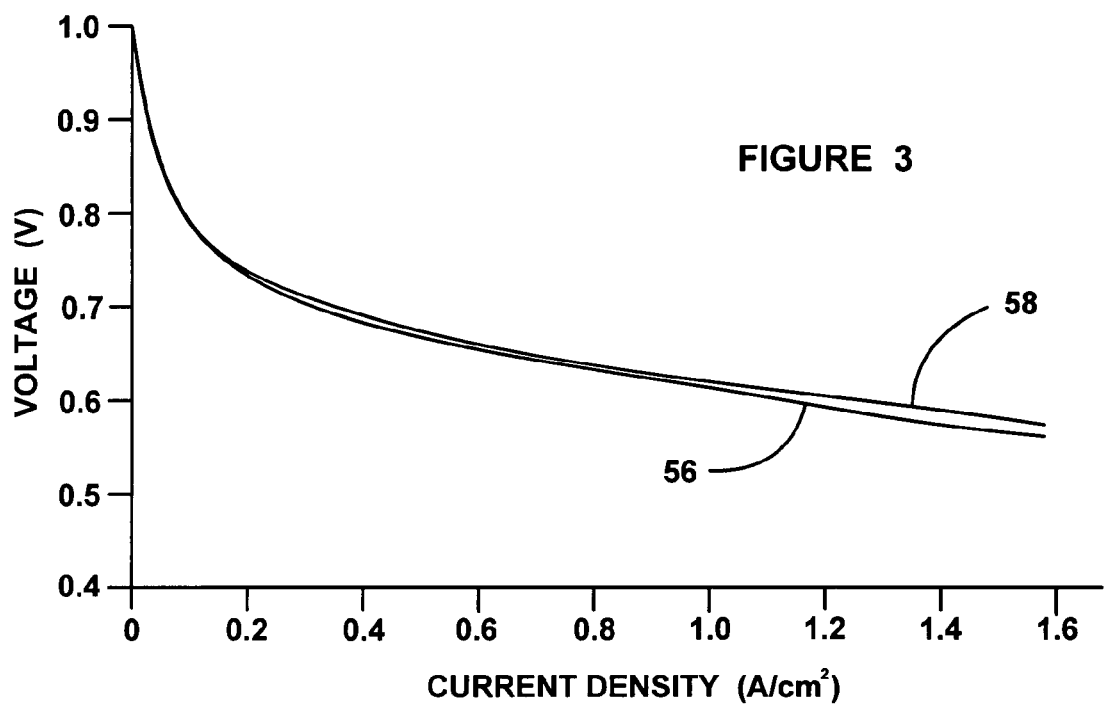
FIG. 3 is a graph with current density on the horizontal axis and voltage on the vertical axis showing the polarization curves for a catalyst coated membrane MEA prepared by a decal transfer with hot-pressing and an MEA fabricated by direct spray of catalyst on the membrane with no hot-pressing.

FIG. 3 is a graph with current density on the horizontal axis and voltage on the vertical axis showing two polarization curves for an MEA. Particularly, graph line 54 is the polarization curve for a catalyst-coated membrane MEA prepared by a decal transfer with hot-pressing of the prior art. Graph line 52 is the polarization curve for the MEA 24 being formed by direct spray of the catalyst ink 18 onto the membrane 14 with no hot-pressing of the invention.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for fabricating a membrane electrode assembly (MEA), said method comprising:
   providing a proton conducting membrane in its protonated form having a first side and a second side;
   spraying a catalyst ink on the first side of the membrane to deposit a catalyst layer of a cathode or an anode of the MEA; and
   clamping the membrane in a clamp to prevent the membrane from wrinkling as a result of the wetness of the catalyst ink on the membrane.

2. The method according to claim 1 further comprising spraying an ionomer layer on the membrane prior to spraying the catalyst ink on the membrane.

3. The method according to claim 1 further comprising drying the MEA under a heat lamp to dry the catalyst layer.

4. The method according to claim 1 wherein spraying the catalyst ink includes spraying the ink over several passes to deposit the ink on the membrane to the desired thickness.

5. The method according to claim 1 further comprising spraying the catalyst ink on the second side of the membrane to deposit a catalyst layer of the other of the anode or the cathode.

6. The method according to claim 1 further comprising soaking the MEA in water.

7. The method according to claim 1 further comprising soaking the MEA in sulfuric acid to remove excess solvent and ensure protonation.

8. The method according to claim 1 further comprising hot-pressing the MEA after the catalyst ink is sprayed on the membrane to remove excess solvent and compress the catalyst layer.

9. A method for fabricating a membrane electrode assembly (MEA), said method comprising:
   providing a proton conducting membrane in its protonated form;
   spraying a catalyst ink on the membrane to deposit a catalyst layer of a cathode or an anode of the MEA, wherein spraying the catalyst ink includes spraying the ink over several passes to deposit the ink on the membrane to the desired thickness; and
   drying the MEA under a heat lamp as the catalyst ink is being sprayed during the several passes to dry the catalyst layer.

10. The method according to claim 9 further comprising spraying an ionomer layer on the membrane prior to spraying the catalyst ink on the membrane.

\* \* \* \* \*